United States Patent

[11] 3,616,195

[72] Inventors Harold A. Rendleman
Bellwood;
Henry Alsberg, Northbrook, both of Ill.
[21] Appl. No. 787,280
[22] Filed Dec. 26, 1968
[45] Patented Oct. 26, 1971
[73] Assignee The Richardson Company
Melrose Park, Ill.

[54] PRINTED CIRCUIT BOARD HAVING METAL LAYER BONDED TO HYDROCARBON BASE AND METHOD OF MAKING IT
10 Claims, No Drawings

[52] U.S. Cl. .......... 161/215, 117/75, 117/132 B, 117/132 BF, 117/138.8 UA, 117/139, 117/161 L, 117/161 UE, 156/315, 156/327, 156/335, 161/216, 161/248, 161/252, 11/258
[51] Int. Cl. .......... B32b 27/32, B32b 25/16, B32b 15/08
[50] Field of Search .......... 260/837, 844; 161/215, 216, 241, 242, 248, 217, 247, 252, DIG. 7; 156/330, 334, 335, 110 A, 314, 315; 117/72, 75, 77, 128.4, 133, 139, 102, 132 B, 132 BF, 138.8 UA, 139, 161 L, 161 UE

[56] References Cited

UNITED STATES PATENTS

| | | | |
|---|---|---|---|
| Re.25,625 | 7/1964 | Been et al. | 260/837 |
| 2,386,112 | 10/1945 | Harkins | 161/215 |
| 2,657,162 | 10/1953 | Tibenham | 161/215 |
| 2,684,350 | 7/1954 | Williams | 161/215 |
| 2,849,298 | 8/1958 | Werberig | 161/215 |
| 2,902,459 | 9/1959 | Teppema | 260/844 |
| 2,902,470 | 9/1959 | Kress | 161/241 |
| 3,318,750 | 5/1967 | Aitken | 161/241 UX |
| 3,450,595 | 6/1969 | Salter et al. | 161/215 |

OTHER REFERENCES

Alliger, G., and Sipthun, I. J., Vulcanization of Elastomers Reinhold, New York, (1964) page 289 relied on. Copy in Group 160.

O' Driscoll, F. F., The Nature and Chemistry of High Polymers, Reinhold, New York (1964) pages 24–25 Relied on. Copy in Group 160.

Aliger et al., Vulcanization of Elastomers, Reinhold, New York, (1964), pages 195–205 relied on.

LaQue, F. L. et al., Corrosion Resistance of Metals and Alloys, Reinhold, New York, (1964) pages 181, 263, 264, 323 and 568 relied on. Copy in Main P.O. Library.

*Primary Examiner*—John T. Goolkasian
*Assistant Examiner*—Willard E. Hoag
*Attorneys*—John L. Hutchinson, William Lohff and Alan M. Abrams

ABSTRACT: Metal clad products useful for printed circuits and the like are produced with a hydrocarbon base through the use of a two-coat adhesive system wherein each coating contains a combination of a normally thermoplastic, polyvinyl polymer and a thermosetting resin and the coating next to the hydrocarbon base contains a free radical producing catalyst. Multifunctional monomer additives such as triallyl cyanurate have also been found useful. The resultant cured products are characterized by good adhesion and by resistance to hot solder at temperatures in the order of about 500° F.

PRINTED CIRCUIT BOARD HAVING METAL LAYER BONDED TO HYDROCARBON BASE AND METHOD OF MAKING IT

BACKGROUND

This invention relates to metal clad products with a hydrocarbon base and more particularly to metal clad products utilizing as an adhesive system a combination of a normally thermoplastic, polyvinyl polymer and a thermosetting resin. More particularly, the adhesive system utilizes two coatings wherein the second coating contains a free radical producing catalyst.

Adhesives containing blends of normally thermoplastic polymers such as polyvinyl butyral and thermosetting resins such as phenolic resin have been used to bond metal foil by an oxide coating to phenolic laminates. However, attempts to use this type of adhesive to bond metal foil to laminates based on hydrocarbon resins have not been entirely successful and have usually resulted in products with inferior peel strength and more often with unsatisfactory performance in contact with molten solder at temperatures normally used in dip soldering (e.g. 500° F.). Performance is usually measured by the time that a sample exhibits resistance to hot solder. A general reference point for satisfactory performance is in the order of 5 seconds.

Since hydrocarbon laminates are identified with excellent electrical properties, it is desirable to provide metal clad products using these hydrocarbon substrates, which are characterized by resistance to molten solder at temperatures in the order of about 500° F.

SUMMARY

Briefly, the invention is directed to the production of hydrocarbon-based metal clad products wherein the adhesive system utilizes a blend of a normally thermoplastic, polyvinyl polymer and a thermosetting resin. The system of particular interest requires two coats of the adhesive wherein the coat adjacent to the hydrocarbon base contains a free radical producing catalyst and one or more multifunctional monomers. The resulting composite when cured exhibits remarkable adhesion and resistance to hot solder.

DETAILED DESCRIPTION

Metal clad products are useful for printed circuit boards and associated purposes in the electrical industry and are associated with such metals as copper, aluminum, nickel and the like.

Adhesives utilizing blends of normally thermoplastic polymers and thermosetting resins are known and described in Houwink and Salomon's Adhesion And Adhesives, Elsevier, 1965, under the general heading of two-polymer adhesives. These materials are useful in metal bonding to achieve a combination of toughness and heat resistance.

Polyvinyl polymers are utilized as the thermoplastic polymer and include polyvinyl esters, ethers, acetals and alcohol and the like. Particularly important are the polyvinyl acetals derived from polyvinyl alcohol and an aldehyde such as formaldehyde, butyraldehyde and the like which have some unreacted alcohol groups in the polymer.

Thermosetting resins include phenolic resins, epoxy resins, urea resins and the like and advantageously, phenolic resins based on phenol-formaldehyde products. The ratio of the thermoplastic to thermosetting resin can be varied widely although it is usually based on a weight ratio in the order of about 4:1 to 1:4. Usually these components are applied in a suitable solvent to form each coating. Advantageously, the solvent is one or mixture of two or more solvents which can be effectively removed at temperatures in the order of about 200° F. and below. Generally, solvents based on organic ketones, alcohols and cellosolves provide very useful results.

As described previously, the invention is directed to a metal clad product with a hydrocarbon base and the associated process wherein a metal foil with an oxide is coated with a blend of a normally thermoplastic, polyvinyl polymer and a thermosetting resin and then with a second coating of the blend containing a free radical producing catalyst. The multicoated metal foil is then bonded to a hydrocarbon laminate or other hydrocarbon substrate to produce a metal clad hydrocarbon composite. During the bonding step or subsequently thereto, the composite is subjected to curing conditions to activate the free radical producing catalyst and produce a cured product. Curing conditions usually involve temperatures in the order of 225°–400° F. and more advantageously about 275°–350° F. The second range is particularly useful with hydrocarbon laminates based on cellulosic reinforcing elements.

Free radical producing catalysts include the peroxides and advantageously the organic peroxides. Those which resist moderate processing temperatures (i.e. below 200° F.) are particularly advantageous. Those preferred have a 10-hour half life identified with temperatures above about 200° F. Suitable peroxides include t-butyl peroxyacetate, t-butyl peroxybenzoate, dicumyl peroxide, di-t-butyl peroxide, methylethylketone peroxide and the like. Normally, sufficient catalyst is utilized to provide free radical formation and increased curing. Approximately 0.5–10 weight percent of the coating on a solids basis provides useful results. In addition to the use of catalyst in the second coating, its use in the first coating usually provides improvement compared to its absence in either coat.

The hydrocarbon base is usually an incompletely cured product based on an olefinically unsaturated hydrocarbon polymer such as butadiene and copolymers thereof. Advantageously, a copolymer of butadiene and styrene is used to prepare the hydrocarbon substrate. The hydrocarbon base usually also contains a curing agent such as a free radical producing catalyst. Frequently, reinforcing elements such as paper, cotton, glass, inorganic minerals and the like are used with the unsaturated hydrocarbon polymer.

In the process of producing the inventive metal clad products, it is often advantageous to include reactive, multifunctional monomers having 2–4 reactive groups such as triallyl cyanurate, trimethylolpropane trimethacrylate, 1,3 butylene dimethacrylate and the like in the second coating. In addition to being present in the second coating, these monomers are also advantageously added to the first coating often in combination with peroxide. In addition to being multifunctional, these monomers advantageously have boiling points in excess of 200° F. and are therefore useful when coatings are applied with solvents.

While the above description has been primarily directed to metal clad products with metal on one side, it is to be understood that such products with metal on both sides can also be readily produced by the above procedures.

The following examples illustrate some of the embodiments of this invention. It is to be understood that these are for illustrative purposes only and do not purport to be wholly definitive to conditions or scope.

EXAMPLE I

One ounce copper foil, thickness about one mil with copper oxide coating on one side, was coated on the oxide side with a solution containing phenolic resin and polyvinyl butyral in equal amounts. The coated foil was dried for about 6 minutes at about 210° F. followed by about three minutes at about 285° F. Thickness of the dried coating was slightly less than 1 mil. One portion of this coated copper was retained without further treatment. A second portion of the copper foil was recoated with a solution containing phenolic resin, polyvinyl butyral and dicumyl peroxide. Four other portions were recoated with solutions of phenolic resin and polyvinyl butyral containing dicumyl peroxide plus triallyl cyanurate and/or trimethylolpropane trimethacrylate. The recoat was dried for about 15 minutes at about 200° F. Total thickness of the two coats was about 2.5 mils.

Copper clad laminates were prepared using each of the five recoated copper foils and also the single coated copper foil. Each laminate was prepared from eight plies of a hydrocarbon coated paper and a sheet of the coated copper foil. The hydrocarbon paper was based on a phenol-formaldehyde treated paper which was coated with a graft copolymer of polybutadiene, styrene and a small amount of divinyl benzene in combination with a peroxide catalyst. Each laminate from the hydrocarbon paper and coated copper foil was cured for about 1 hour at about 330° F. under a hydraulic pressure of about 1,000 p.s.i.g.

Each copper clad laminate was subjected to tests for peel strength and resistance to hot solder. The results together with the composition of the adhesive for each laminate are in Table I below. Also shown are results for a copper clad laminate prepared in another series under similar conditions using 1,3 butylene dimethacrylate.

TABLE NO. I

| | | | | | | | |
|---|---|---|---|---|---|---|---|
| First coat, pts./wt.: | | | | | | | |
| Phenolic resin | 50 | 50 | 50 | 50 | 50 | 50 | 50 |
| Polyvinyl butyral | 50 | 50 | 50 | 50 | 50 | 50 | 50 |
| Second coat, pts./wt.: | | | | | | | |
| Phenolic resin | | 50 | 45.3 | 45.3 | 45.3 | 43.25 | 45.3 |
| Polyvinyl butyral | | 50 | 45.3 | 45.3 | 45.3 | 43.25 | 45.3 |
| Triallyl cyanurate | | | 9.4 | ------ | 4.7 | 9.0 | ------ |
| Trimethylolpropane trimethacrylate | | | | 9.4 | 4.7 | 4.5 | ------ |
| 1,3 butylene dimethacrylate | | | | | | | 9.4 |
| Dicumyl peroxide | | 6 | 6 | 6 | 6 | 6 | 6 |
| Peel strength, lb./inch | 6.1 | 7.5 | 8.0 | 7.0 | 7.5 | 8.75 | 6.3 |
| Solder test, sec. at 500° F | <1.0 | 4.8 | 6.4 | 15.4 | 13.3 | 15.8 | 13.4 |

The above results demonstrate the usefulness of the two coat system with peroxide in the second coat as well as the improved performance by the addition of triallyl cyanurate, trimethylolpropane trimethacrylate and 1,3 butylene.

EXAMPLE II

Three copper clad laminates were prepared as described in Example I using a one coat system with the coating modified, a two coat system with the second coat modified and a two coat system with both coats modified. The results are shown in Table II below.

TABLE NO. II

| | | | |
|---|---|---|---|
| First coat pts./wt.: | | | |
| Phenolic resin and polyvinyl butyral | 86.5 | 100 | 86.5 |
| Trially cyanurate | 9.0 | ---------- | 9.0 |
| Trimethylolpropane trimethacrylate | 4.5 | ---------- | 4.5 |
| Dicumyl peroxide | 6.0 | ---------- | 6.0 |
| Second coat, pts./wt.: | | | |
| Phenolic resin and polyvinyl butyral | None | 86.5 | 86.5 |
| Triallyl cyanurate | | 9.0 | 9.0 |
| Trimethylolpropane trimethacrylate | | 4.5 | 4.5 |
| Dicumyl peroxide | | 6.0 | 6.0 |
| Peel strength, lb./in | 9.0 | 8.75 | 8.75 |
| Solder test, sec. at 500° F | 3.5 | 15.8 | 8.0 |

As the results demonstrate, the modified two coat system exhibited improved performance over the one coat system. In addition, modification of both coats also exhibited improved performance.

We claim:

1. A metal clad hydrocarbon composite for printed circuit boards comprising an oxidized metal foil, a first coating on the oxidized surface comprising a mixture of a resin selected from the group consisting of polyvinyl alcohol, polyvinyl acetal and polyvinyl butryal and a phenolaldehyde resin, said first coating being bonded to a hydrocarbon substrate by means of an adhesive coating comprising the same components as said first coating with the addition of a peroxide curing agent, said hydrocarbon substrate comprising an incompletely cured polymer selected from the group consisting of butadiene homopolymers and copolymers.

2. The composite of claim 1 in cured form resulting from treatment under curing conditions.

3. The composite of claim 1 wherein the incompletely cured polymer of the hydrocarbon substrate is a copolymer of butadiene and styrene.

4. The composite of claim 1 wherein the metal foil is copper, the resin is polyvinyl acetal and the phenol-aldehyde resin is a phenol-formaldehyde resin and the incompletely cured polymer of the hydrocarbon substrate is a copolymer of butadiene and styrene.

5. The composite of claim 4 wherein the polyvinyl acetal and phenol-formaldehyde resin are present in a weight ratio of about 4:1 to 1:4, respectively.

6. The composite of claim 1 wherein at least the adhesive coating contains a multifunctional monomer reactive in the combination with the resin and the phenol-aldehyde resin, said monomer having a boiling point above about 200° F. and selected from the group consisting of triallyl cyanurate, trimethylolpropane trimethacrylate, and 1,3 butylene dimethacrylate.

7. A process for producing a metal clad hydrocarbon composite for printed circuit boards which comprises applying a first coating comprising a mixture of a resin selected from the group consisting of polyvinyl alcohol, polyvinyl acetal and polyvinyl butyral and a phenol-aldehyde resin to an oxidized metal foil, and bonding said first coating to a hydrocarbon substrate by applying an adhesive coating comprising the same components as said first coating with the addition of a peroxide curing agent to the first coating, said hydrocarbon substrate comprising an incompletely cured polymer selected from the group consisting of butadiene homopolymers and copolymers.

8. The process of claim 7 wherein the hydrocarbon composite is cured by treating under curing conditions.

9. The process of claim 7 wherein the metal foil is copper, the resin is polyvinyl acetal and the phenol-aldehyde resin is a phenol-formaldehyde resin and the incompletely cured polymer of the hydrocarbon substrate is a copolymer of butadiene and styrene.

10. The process of claim 9 wherein the polyvinyl acetal and the phenol-aldehyde resin are present in a weight ratio of about 4:1 to 1:4, respectively.